US005533447A

United States Patent [19]
Johnson et al.

[11] Patent Number: 5,533,447
[45] Date of Patent: Jul. 9, 1996

[54] METHOD AND APPARATUS FOR PRINTING A COLOR FILTER INK PATTERN

[75] Inventors: Ronald E. Johnson, Tioga, Pa.; William E. Lock, Horseheads; Robert D. Shoup, Hammondsport, both of N.Y.

[73] Assignee: Corning Incorporated, Corning, N.Y.

[21] Appl. No.: 145,244

[22] Filed: Nov. 3, 1993

[51] Int. Cl.⁶ .............................. B41M 1/20; B41M 1/34
[52] U.S. Cl. .................. 101/211; 101/34; 101/35; 101/41; 101/151; 101/163; 101/170; 101/175; 101/424.1; 101/483; 101/488; 101/491; 101/DIG. 43; 156/235; 156/240; 156/277; 427/165; 427/287; 427/511
[58] Field of Search ............................. 101/33, 34, 35, 101/36, 38.1, 41, 150–154, 163, 170, 171, 175, 176, 211, 217, 450.1, 424.1, 483, 487, 488, 491–493, 129, DIG. 43; 156/235, 240, 277; 427/162, 165, 266, 287, 511

[56] References Cited

U.S. PATENT DOCUMENTS

| | | | |
|---|---|---|---|
| 4,035,214 | 7/1977 | Shuppert et al. | 101/211 |
| 4,209,551 | 6/1980 | Masaki et al. | 101/150 |
| 4,445,432 | 5/1984 | Ford, Jr. et al. | 101/152 |
| 4,549,928 | 10/1985 | Blanding et al. | 156/660 |
| 4,836,102 | 6/1989 | Cicci | 101/41 |
| 5,127,330 | 7/1992 | Okazaki et al. | 101/491 |

FOREIGN PATENT DOCUMENTS

| | | | |
|---|---|---|---|
| 242028 | 1/1987 | Germany | 101/424.1 |
| 59968 | 4/1982 | Japan | 101/491 |
| 284441 | 12/1986 | Japan | 101/424.1 |
| 119091 | 5/1987 | Japan | 101/154 |
| 147359 | 6/1993 | Japan . | |

OTHER PUBLICATIONS

K. Mizuno and S. Okazaki, Printing Color Filter for Active Matrix Liquid–Crystal Display Color Filter, Japanese Journal of Applied Physics, vol. 30, No. 118, Nov. 1991, pp. 3313–3317.

K. Leyama et al., Color Filter for Liquid Crystal Display, International Flat Panel Display Conference, SEMI–SEMICON/West '92, Section B–41—B–59.

W. C. O'Mara, Active Matrix Liquid Crystal Displays Part I: Manufacturing Process, Solid State Technology, Dec. 191, pp. 65–70.

K. Ikiaki, Low Cost Technology for Producing LCD Color Filters Transfer Print Method, Nikkei MI, vol:58, pp. 83–87 (90–04).

*Primary Examiner*—Stephen Funk
*Attorney, Agent, or Firm*—Robert L. Carlson

[57] ABSTRACT

A method and apparatus for printing a multi-color ink pattern on a substrate surface which comprises arranging a series of patterned surfaces with each patterned surface having a pattern that is unique to one of the colors and that corresponds to the pattern of that color in the multi-color pattern, supplying to each patterned surface a radiation-curable ink formulation, having an appropriate colorant to form an ink pattern thereon, transferring individually the color pattern from each patterned surface to a collector roll, increasing the cohesiveness of the ink sufficiently to permit complete transfer of the pattern, forming a composite of the color patterns on a collector roll, and transferring the composite pattern in its entirety to the substrate surface.

40 Claims, 5 Drawing Sheets

METHOD AND APPARATUS FOR PRINTING A COLOR FILTER INK PATTERN

RELATED APPLICATION

A related application, entitled COLOR FILTER AND METHOD OF PRINTING and assigned to the same assignee as this application, Ser. No. 08/145,155, has been filed Nov. 3, 1993 in the names of P. L. Bocko and R. E. Johnson. That application is directed to a printed color filter for an AMLCD glass panel and to a method for printing such color filter on a glass substrate.

FIELD OF THE INVENTION

A method of printing a multi-color ink pattern on a substrate surface employing radiation-curable inks.

BACKGROUND OF THE INVENTION

It is a familiar practice in the decorating art to print a multi-color pattern on a substrate surface by transfer (offset) printing of individual ink patterns. Each individual pattern is formed with a different colored decorating ink. The substrate may, for example, be a glass, glass-ceramic, or ceramic body. Individual ink patterns are supplied separately to an elastomeric transfer (offset) roll from a series of patterned surfaces. Each surface is patterned to form an individual ink pattern for delivery to the transfer roll. A patterned surface may be provided by a gravure plate or roll, a lithographic roll, a typographic roll, or a silk screen.

Normally, when printing to non-porous surfaces, the ink pattern dries to a cohesive, tacky state on the elastomeric roll by evaporation or solvent penetration into the roll. The ink pattern is then brought into intimate mechanical contact with the substrate surface. It is completely transferred when it has sufficient cohesion and greater affinity for that surface than it has for the transfer roll. In some cases, when using solvent-based inks, complete transfer is not obtained, and print quality, particularly in regard to definition, may be reduced as a consequence.

Once the transferred ink pattern is sufficiently dry, successive patterns of other colors may be applied, each from its own pad or roll, to create a multi-colored pattern. Thus, each color pattern must be applied separately to form the multi-colored pattern.

U.S. Pat. No. 4,445,432 (Ford et al.) discloses a method and apparatus which utilize a double offset technique for applying thermoplastic decorating inks onto a substrate to form a multi-color pattern. In this procedure, an ink pattern of each color is successively transferred onto a collector roll to form a fully registered, multi-colored ink pattern on the collector roll. This multi-colored pattern is then transferred to the substrate in a single printing step. A primary advantage obtained by this procedure, with respect to conventional offset gravure practice, is that of superior registration, particularly for substrates of complex geometry. The collector roll renders pattern registration independent of substrate geometry.

U.S. Pat. No. 4,549,928 (Blanding et al.) describes using a double offset technique for printing the phosphors and the black matrix on color TV panels. In this procedure, thermoplastic, pressure-sensitive inks, corresponding to the red, green, and blue color phosphors and the black matrix, are applied separately to the collector roll to form the desired multi-color pattern. This pattern is then transferred as a complete pattern to the TV tube panel.

The double offset printing techniques described in the Ford et al. and Blanding et al. patents employ pressure-sensitive, hot-melt inks. These inks are printed from heated gravure rolls. The inks cool sufficiently on the offset surfaces to develop the cohesive strength required to achieve 100% ink transfer between the offset surfaces and the collector roll, and between the collector roll and the substrate.

To obtain complete transfer, the cohesive strength of the ink must exceed the adhesive strength to the surface of the transferring member. Adhesion must, of course, be greater to the receiving surface than to the releasing or transferring surface. This means that inks must exhibit less adhesion to the first offset surface than to the collector, and less adhesion to the collector than to the final substrate. Heretofore, silicones have been used as the materials for both offset surfaces.

The inks generally used have been thermoplastic in nature. They have been printed onto the first offset surface from heated gravure plates or rolls, and, even more recently, by use of heated screens. Once on the offset surface, the inks cool, developing sufficient cohesive strength for transfer. The inks were formulated to retain sufficient tack after cooling so that they would adhere to surfaces simply by applying sufficient pressure. Since the inks were subsequently fired to consolidate the pigmented glass frits and remove the organics, no particular durability of the organics was required. It has been demonstrated, however, that heat reactive (thermoset) inks can be printed as hot melts at 60°–70° C. and cured with a post-cure at higher temperatures of 150°–200° C.

The double offset procedure, employing hot-melt inks, has been found particularly useful for decorating articles such as dinnerware. However, problems have been encountered in attempting to apply the procedure to printing of precision patterns. This is particularly true for surfaces that may subsequently be required to withstand elevated temperatures, for example 250° C. In particular, the pressure-sensitive, hot-melt inks are not stable at elevated temperatures. Temperatures above 150° C. may result in plasticizer volatilization and oxidative degradation of the typical organic ingredients employed. Further, prolonged heating at 250° C. can even result in distortion of an ink pattern. Excessive flow of the ink elements of the pattern may occur on the substrate surface as viscosity decreases with increase in temperature.

It is possible to develop hot-melt inks that can be subsequently cured thermally or by radiation. However, the heated ink procedure is not preferred where precise registration is required. Slight temperature variations, either in the print surface, or through conduction into the printing apparatus, can result in registration variability.

It has been proposed by K. Mizuno and S. Okazaki, in Japanese Journal Of Applied Physics, Vol. 30, No. 118, Nov., 1991, pp. 3313–3317, to produce a color filter by a process wherein ink on a transfer roll is cured by UV exposure, and then transferred to a glass coated with an adhesive layer. It would, of course, be desirable to collect and transfer a complete pattern, and to do so without the need for an adhesive layer.

It has also been proposed to produce a color filter by photolithography in the form of film. The pattern may then be inspected, and, if necessary, discarded without printing. If the pattern is accepted, the film is transferred directly to the glass substrate. This proposal is described by K. Ikiaki in a publication entitled "Low Cost Technology for Producing LCD Color Filters Transfer Print Method" In Nikkei MIr Vol: 58, pp. 83–87 (90-04). The process still involves photolithography.

In addition to the items mentioned above, attention is also to a publication by W.C. O'Mara, entitled "Active Matrix Liquid Crystal Displays Part I: Manufacturing Process" appearing at pages 65–70 in the Dec. 1991 issue of *Solid State Technology.*

It is then a basic purpose of the invention to provide an improved method of printing a multi-color ink pattern on a substrate surface. A further purpose is to provide a method of producing a multi-color ink pattern on a substrate surface that is particularly adapted to producing a precision pattern. Another purpose is to provide a method of producing a multi-color pattern that will withstand elevated temperatures up to about 250° C. without needing to first pyrolyze organics, and then to melt a glass frit at an even higher temperature. A further purpose is to adapt the double offset printing technique to the production of precision multi-color ink patterns.

SUMMARY OF THE INVENTION

The invention resides in a method of printing a multi-color ink pattern on a substrate surface which comprises the steps of arranging a series of surfaces in which each surface has a pattern that is unique to one of the colors, and to the pattern of that color, in the multi-color pattern, supplying to each patterned surface a radiation-curable ink formulation having an appropriate colorant to form an ink pattern thereon, transferring individually the colored ink pattern from each patterned surface to a collector roll, forming a composite of the color patterns on the collector roll, increasing the cohesiveness of the ink sufficiently to permit complete transfer of the pattern, and transferring the composite pattern in its entirety to the substrate surface.

BRIEF DESCRIPTION OF THE DRAWINGS

FIG. I is a schematic view illustrating a prior art offset printing technique.

FIG. II is a perspective view of one form of apparatus for practicing the invention.

FIG. III is a partial side view of the apparatus of FIG. II.

FIG. IV is a perspective view of another form of apparatus for practicing the invention.

FIG. V is a partial side view of the apparatus of FIG. IV.

FIG. VI is an enlarged view of FIG. V.

DESCRIPTION OF THE INVENTION

Figure 1:
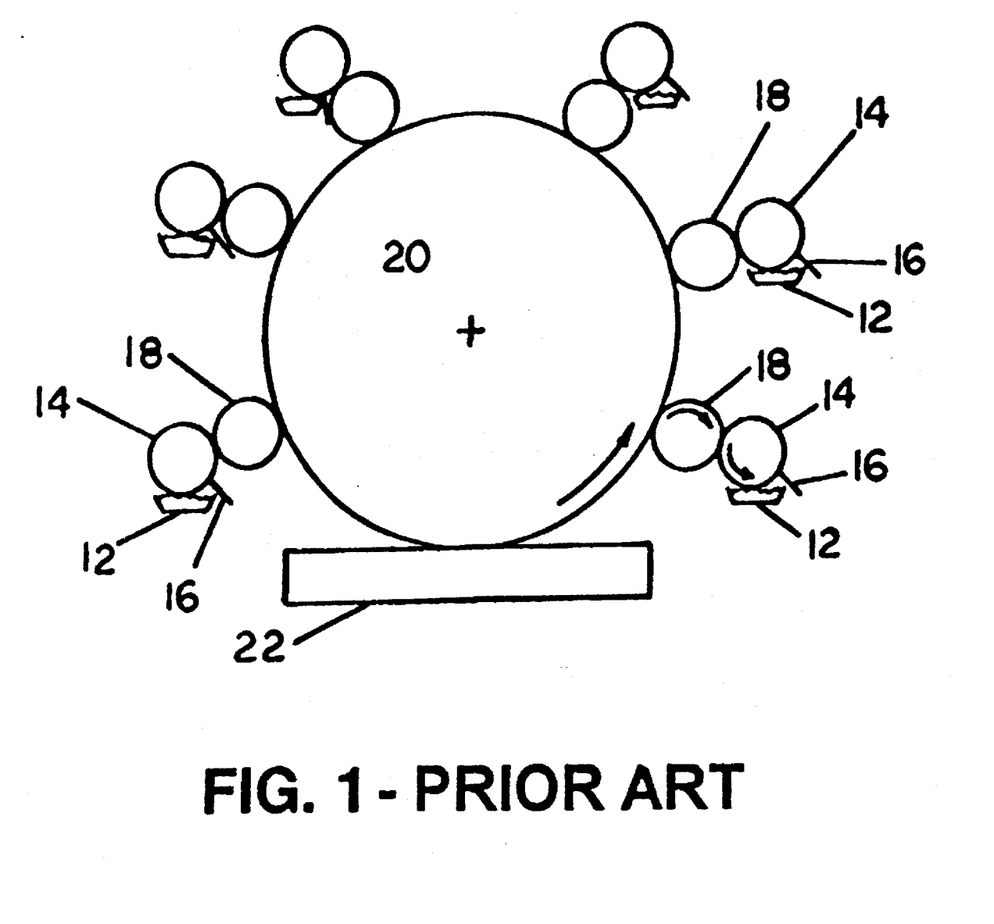
Figure 2:
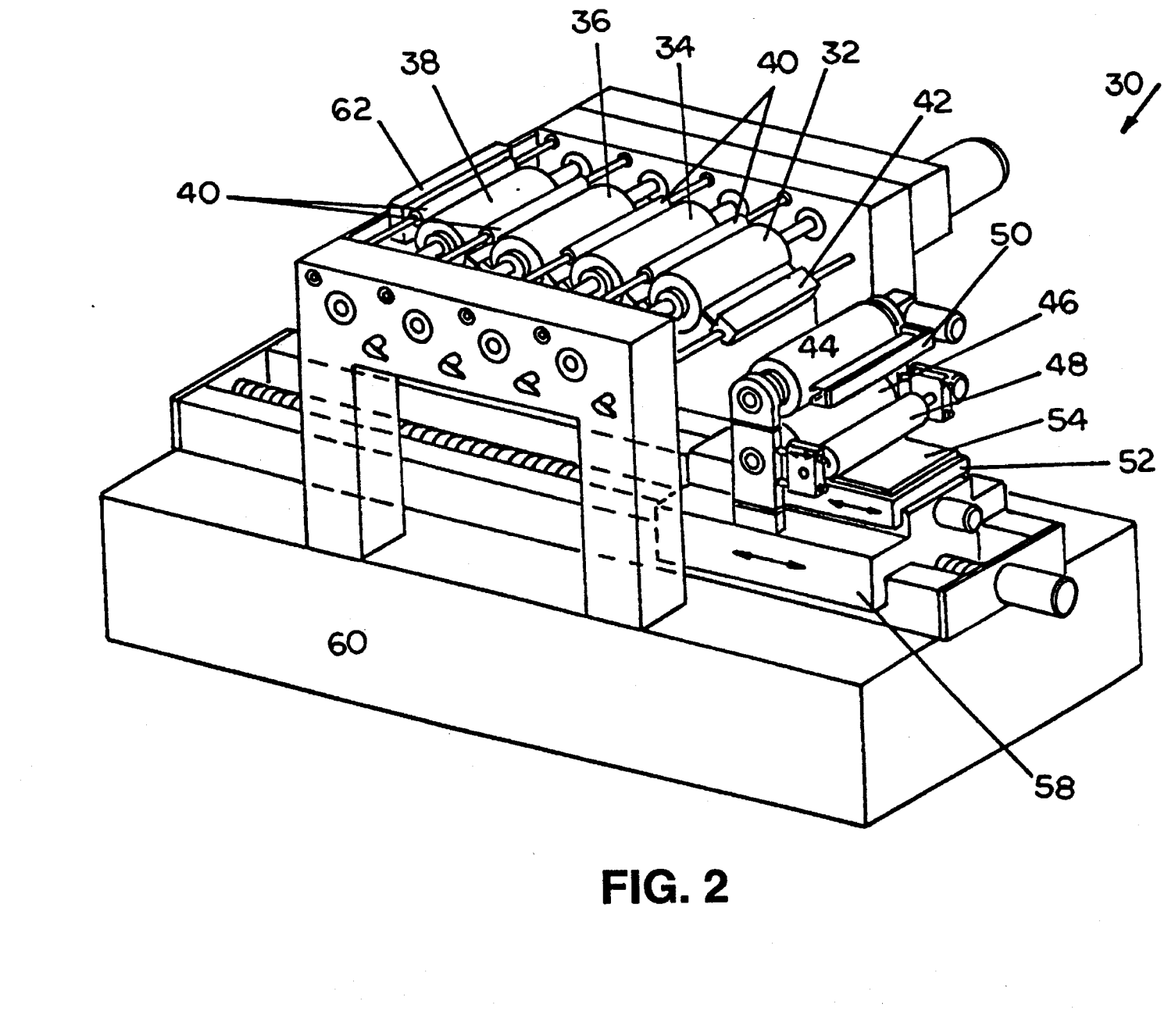
Figure 3:
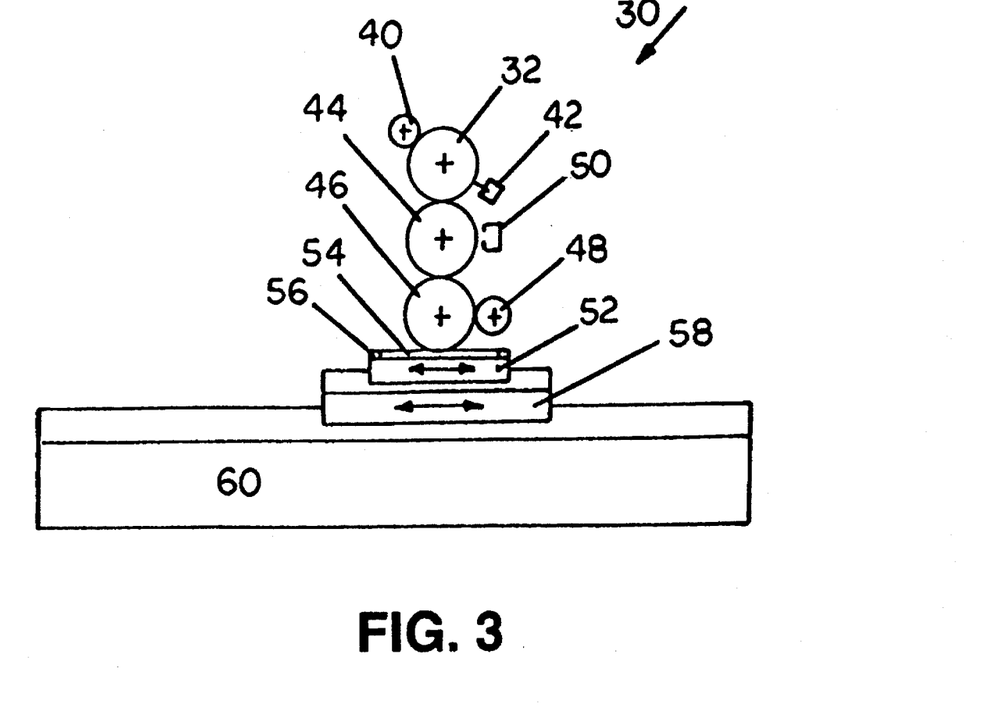
Figure 4:
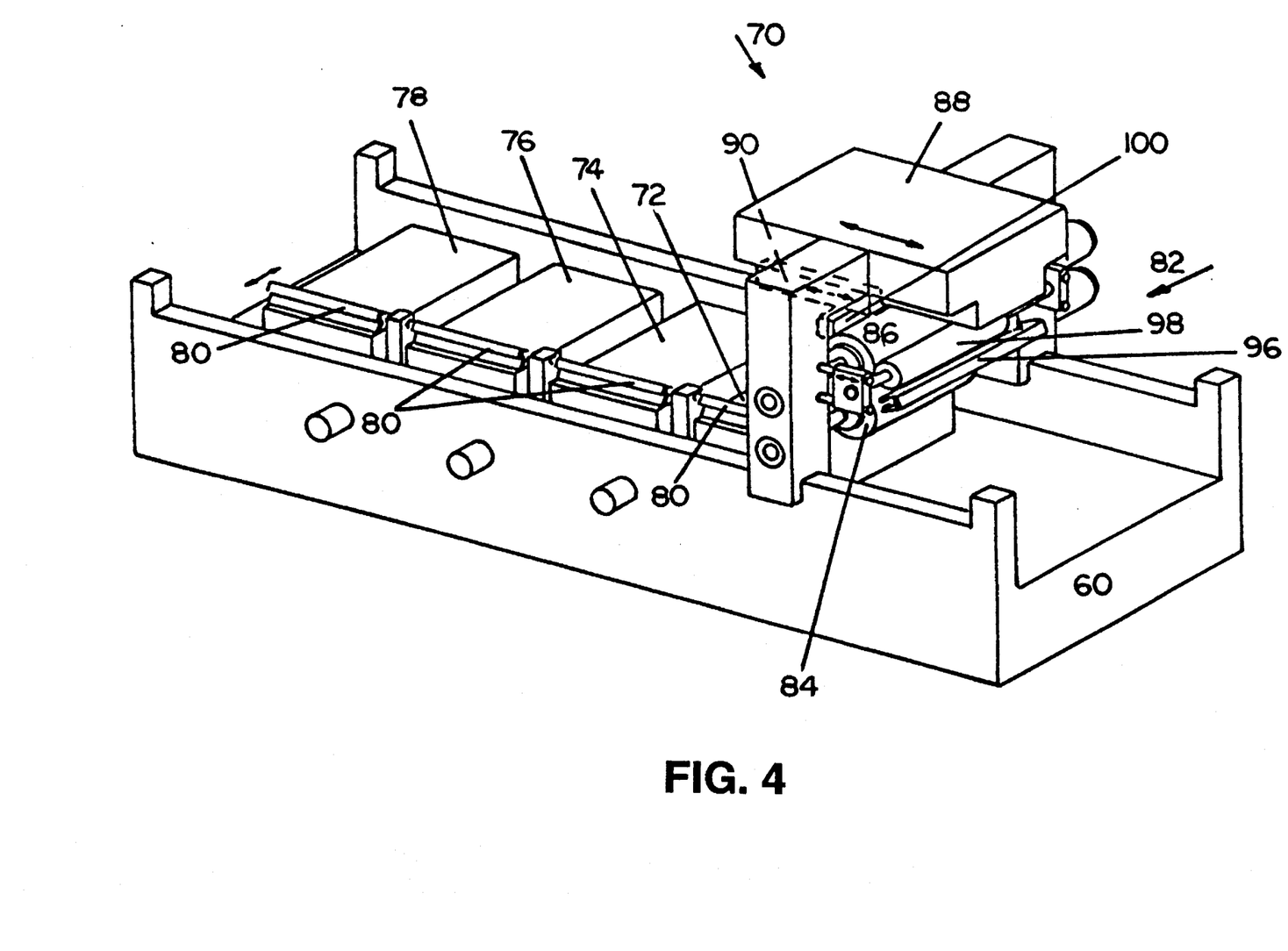
Figure 5:
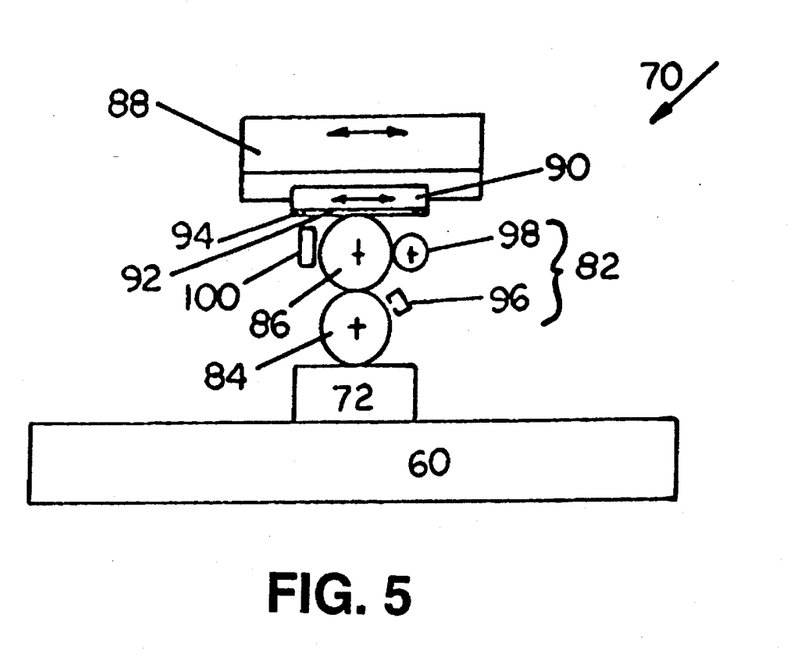
Figure 6:
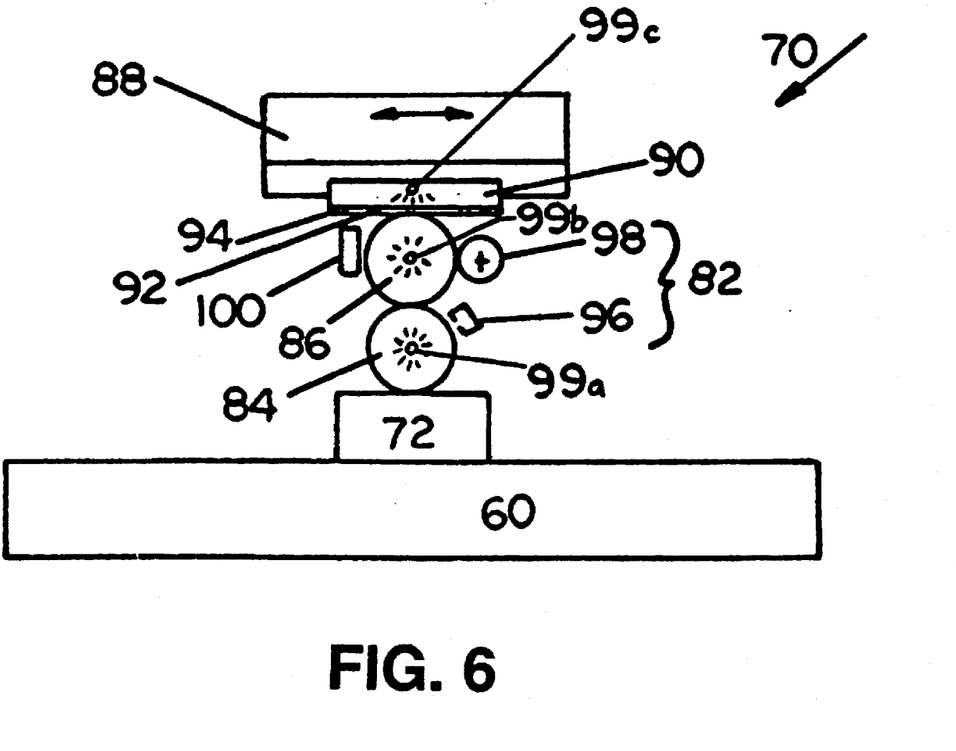

FIG. I of the drawings is a schematic illustration of the double offset printing technique as disclosed in the Ford et al. —432 patent noted earlier. As there described, "n" printing stations are provided. In describing the present invention, we employ four printing stations, such as might be used in producing a multi-color pattern for LCD color filters. Thus, one station might print a linear black matrix that will surround the basic red, green, and blue color dots printed at the other three stations.

As described in the Ford et al. patent, each printing station includes a supply of ink 12; a heated gravure roll 14 with a patterned surface; a transfer roll 18; and a doctor blade 16. Rolls 18 and 14 are mounted in pairs at each station. Each gravure roll 14 has a particular pattern engraved therein. The pattern in each roll is determined by the pattern desired for that color ink in the pattern on the substrate 22.

Each ink is deposited in the pattern formed on its gravure roll 14 and doctored by blade 16. Each color pattern is carried into intimate contact with transfer roll 18 to reproduce the color pattern on roll 18. The color pattern is then brought into contact with collector 20. There, a 100% transfer from roll to collector 20 occurs due to cooling on the transfer roll. As explained more fully later, the need to cure before transfer is related to the type of ink employed, rather than the process. If a radiation-curable ink is employed, the ink must be partially cured, or gelled, to a tacky state before transfer. In the case of a thermoplastic ink, as used in the Ford et al. patent, it is only necessary to cool the ink on the roll.

At each station, the particular color pattern of that station is deposited on collector 20 to form a composite pattern on collector roll 20. This enables substrate 22 to receive a fully registered print in a single printing step.

A major advantage of the double offset, or collector, printing technique is that the color-to-color registration becomes independent of final substrate geometry. The more complex the geometry of the final substrate, the greater the advantage. Moreover, the tighter the registration requirements, the greater the advantage.

As illustrated in FIG. I, a transfer roll 18 is provided at each station. However, a different arrangement, which embodies a single transfer roll 18, may also be employed. In such an arrangement, the single transfer roll 18 is indexed from station to station. At each station, transfer roll 18 receives an ink pattern from the gravure roll 14 at that station. The ink pattern is transferred to collector roll 20 which is indexed in conjunction with transfer roll 18.

In any case, for complete transfer with radiation-curable inks, partial curing or gelling must occur during, or before, transfer of a pattern to the collector roll. Thus, each pattern must be cured to a tacky state before transfer.

Use of a single transfer roll 18 eliminates variability resultant from differences in the deformation of the individual rolls. Such differences can be caused by slight dimensional differences, compositional differences, or durometer differences. By using a single roll 18, there is no change in the relative axial position of roll 18 to roll 20 during the printing process. Consequently, optimum registration can be repeatably maintained through repetitive printing cycles.

Non-uniform pattern distortion from offset rolls between subsequent printing stations is a significant contributory factor to misregistration between colors in conventional printing. The collector process, however, can utilize a common transfer roll for all colors and can maintain a constant positional relationship between the transfer roll and collector throughout the process operation. By keeping the first and second offset rolls as a constant, as well as their positional relationships to one another, a higher level of consistency can be achieved than is feasible with conventional printing processes.

Consequently, use of a single roll pair for all color patterns, and the single step application of the registered print, offers registration advantages even when the substrate geometry is not complex. This is the case in printing patterns on a flat panel substrate.

The inks used in the process described in the Ford et al. —432 patent were pressure-sensitive, hot-melt inks. These inks were printed from heated gravure rolls. They were cooled on the offset surfaces to develop sufficient cohesive strength to achieve 100% ink transfer both between offset surfaces, and between the collector roll and the substrate. As pointed out earlier, however, hot melt inks have several disadvantages for color filter printing, but are not necessarily precluded from use.

The present invention utilizes the double offset printing technique disclosed in the Ford et al. —432 patent. However, rather than using pressure-sensitive, hot-melt inks as heretofore, we use inks that are specially formulated to permit radiation curing. Such inks can be formulated to cure rapidly to a pressure-sensitive (tacky) state. They subsequently undergo further curing, either by radiation or thermal post-cure, to achieve a hard, tack-free, durable state. There are two distinctly different approaches to formulating radiation-curable inks for compatibility with the collector process.

In the first approach, ultra-high viscosity, radiation- curable oligomers can be combined with just sufficient monomer to render the material into a tacky paste with good cohesiveness. These inks can be printed from heated gravure rolls much like the hot-melt inks. The cohesiveness needed for transfer between silicones, and to the final substrate, is developed by cooling on the silicone surface. Typically, viscosity increases, on average, about 10% for each ° C. that the ink cools. Cohesiveness may also be enhanced in the formulations by adding compatible, relatively high viscosity, thermoplastic polymers. An example is cellulose acetate butyrate in an amount up to about 20% by weight. The inks are cured after transfer to the glass by exposure to radiation. UV-light, an electron beam, or high intensity visible light, may be used, depending upon the photoinitiator employed.

In this approach, any type of radiation-curable ink can be used to meet these criteria. Curing takes place after transfer of an ink pattern to the substrate. Therefore, an intermediate cure by radiant energy on the roll provides no advantage, except possibly to enhance the cohesion. Consequently, a reactive hot melt can be a free-radical type ink, a cationic type, or a hybrid of the two. It can also be a hybrid between a radiation-curable ink component and a thermal-curing ink component.

These inks can readily be formulated to develop sufficient cohesiveness on cooling to achieve 100% transfer. They can then continue to be cured to a durable, tack-free state upon the substrate, either by radiation exposure or by thermal cure. Such inks can also be post-cured thermally to improve stability.

In a second approach, radiation-curable inks are printed from ambient temperature gravure rolls onto the silicone transfer rolls. The ink on the transfer rolls is then exposed to radiation to achieve a tacky, partially cured state. The partial curing increases the cohesiveness, to such extent, that the inks can be subsequently 100% transferred between silicone surfaces, as well as to the final substrate. Final curing can be accomplished by further radiation or thermal post-cure.

With inks that are formulated to print in the manner of hot-melt inks, there is typically no UV curing until after, or during, transfer of the ink to the substrate. Consequently, inks dependent on the free-radical mechanism for curing are quite satisfactory and have the advantage of a faster printing rate. However, for curing during printing, cationic or hybrid inks have the advantage of a potentially broader exposure window for curing.

The radiation-curable inks of interest here are of four general categories: Free-radical, cationic, a hybrid of the free-radical and cationic and a hybrid based on combined radiation and thermal curing mechanisms.

Free-radical inks are characterized by a free-radical photoinitiator. Under influence of radiation, resins having acrylate and methacrylate functional groups, as well as the vinyl group in unsaturated polyester resins, can be cured in the presence of such a photoinitiator.

Cationic inks utilize different resins, primarily epoxy functional resins or vinyl ether functional resins. The epoxy formulations consist principally of epoxide, a polyol and a cationic photoinitiator, primarily triaryl sulfonium salts. The photoinitiator has a positive charge that is activated by radiation to promote curing. Curing is based on ring opening in the epoxide through action of the Lewis acid that is produced by photolysis of a cationic photoinitiator.

The radiation-curable hybrid inks are mixtures of the cationic and free-radical formulations just discussed. These inks partially cure rapidly under light exposure via a free-radical mechanism. This is followed by a slower continuing cure via the cationic mechanism. Unlike the free-radical curing mechanism, the cationic curing mechanism does not cease curing after removal from the radiation exposure. Hybrid free-radical/cationic inks, in fact, are ideal for the process. The free-radical portion will cure rapidly upon radiation exposure, whereas the cationic portion will cure much more slowly. This allows the ink to remain tacky for a sufficient time to complete operation of the printing process. Such inks can be formulated to be curable with UV, electron beam, or high intensity visible light. However, either UV or visible light is preferred due to the ease of incorporation into the printing apparatus.

The following TABLE sets forth, in parts by weight, a typical formulation for each type of radiation-curable ink. In the TABLE, the initial column identifies the several ink components by their generic names. The second column sets forth the trade name for the particular material employed in a formulation. The further columns set forth the formulation for each ink.

In addition, a formulation will contain a suitable color pigment. Use of a dye is not precluded. However, we prefer to avoid use of dyes because of their temperature and light instability. Also, they can interfere with the curing chemistry of the radiation-curable inks.

The formulations in the TABLE represent inks that have been successfully employed. However, no claim is made that they are optimum, and that more effective inks for the purpose may not be formulated.

| Ink Components | Tradename | Free-Radical | Cationic | Free-Radical/Cationic Hybrid |
|---|---|---|---|---|
| Epoxidized Novolac | Quatrex 2010 | — | 70 | 50 |
| Partially acrylated epoxide | Ebecryl 3605 | — | — | 35 |
| Acrylate monomer | Sartomer 351 (TMPTA) | 30 | — | 15 |
| Free-radical Photoinitiator | Darocur 4265 | 3 | — | .5 |
| Cationic Photoinitiator | UVI-6974 | — | 1.5 | 1.5 |
| Silane coupling agent | Z6040 | — | 1.75 | 1.75 |
| Fluorosurfactant | FC-430 | .25 | .25 | .25 |
| Cycloaliphatic epoxide | UVR 6105 | — | 30 | — |
| Acrylated epoxidized novolac with 20% acrylated monomer | Ebecryl 3603 | 70 | — | — |
| Silane coupling | A-174 | 1.75 | — | — |

| Ink Components | Tradename | Free-Radical | Cationic | Free-Radical/Cationic Hybrid |
| --- | --- | --- | --- | --- |
| agent | | | | |
| Curing synergist | Quantacure ITX | 1 | — | — |

Hybrid inks that combine radiation and thermal curing mechanisms can also be formulated for the process. With such ink only the radiation-curable portion is cured upon radiation exposure during the printing process as herein described. The ink is fully cured thereafter by appropriate thermal treatment to cure the thermally-curable portion of the ink.

In the case of near UV (300–400 μm) or visible (400–600 μm) light, it is even possible to initiate cure in the ink from a light source within the transfer roll, or the collector roll. A transfer or collector roll may be constructed with a transparent, glass or plastic, outer shell, and covered with a layer of clear silicone. This allows high intensity visible, or near UV, light to reach the under side of the ink against the silicone roll surface. The ink can, of course, be exposed more conventionally from the top side. There, either high intensity, visible, or UV light can be employed, depending upon the photoinitiator in the ink formulation.

Use of radiation-curable inks, in lieu of thermoplastic inks, has an advantage in that lower viscosity inks can be utilized for printing from the gravure rolls onto the transfer rolls. This facilitates the printing of fine dots. The need to heat the transfer rolls is also obviated.

The low viscosity, light-curable inks, however, were found to bead readily upon silicone release surfaces unless formulated to exhibit plastic flow rheology; that is, a yield point followed by pseudoplastic flow. To minimize this problem, it is desirable to partially cure the inks on the transfer rolls as soon as possible after their deposition thereon. It is also desirable to select silicone materials for the rolls that have less releasing characteristics than would be employed for thermoplastic inks. The radiation-curable inks have higher cohesive strengths after partial curing. This enables satisfactory use of the tighter (less releasing) silicone materials Color filters require thin fine dots or lines, accurately registered. A black matrix also must be printed in close register. The collector process, utilizing radiation-curable inks, can meet these objectives. Hence, it has significant advantages over alternative printing techniques.

The biggest advantage is inherent in use of the collector process because registration is independent of the glass substrate. In consequence, accurate positioning of the substrate is less critical. Also, there is no need for accurate repositioning between colors since the full four-color pattern is applied to the glass in one step.

A major disadvantage of printing, compared to photolithography, is the cross-sectional shape of the printed dot. Photolithography achieves a more flattened, rectangular cross-section which is preferred. The printed dot has a more rounded-top, triangular cross-section due to surface tension and rheological effects of the inks. In typical printing processes, invariably, the ink is cohesively split upon deposition onto a substrate, or onto an offset roll, from a patterned design surface, i.e., screen, gravure plate, etc. This results in a non-uniform surface which can only partially be alleviated by leveling. Excessive leveling causes loss of edge definition.

It is in this area of dot cross-sectional shape that the collector process potentially has another significant advantage over other printing processes. When the ink is initially deposited on the transfer roll, a typical triangular cross-section can be anticipated. The ink is partially cured to a semi-viscous, tacky state upon the transfer roll. In this state, it is compressed between the transfer roll and collector. It is subsequently compressed again between the collector and final substrate. This double compression of the semi-cured ink results in a flattening of the triangular cross-sectional shape.

If this in itself is insufficient to achieve the desired cross-section, it is possible to cure the ink during its compressed condition between the offset rolls, or between the collector roll and the final substrate. This is accomplished by light exposure through a transparent offset roll, or through the transparent substrate as ilustrated in FIG VI. Transparent offset rolls can be constructed by using transparent silicones, bonded onto a transparent glass or plastic core, as the offset surface. Of course, in these cases the materials must be transparent to light in the wavelengths necessary to cure the inks. This has been demonstrated by using photoinitiators which respond in the visible or near UV range.

Curing the ink in the compressed state will, of course, slow the printing rate. However, for an article such as an LCD color filter, very high printing rates are not required to realize economic advantages over current photolithographic procedures. Thus, it has been demonstrated that light-curable inks can be successfully printed via this procedure.

Thicknesses within the range of 5 microns or less can be achieved. In this thickness range, it has also been demonstrated that print speeds of at least 6 cycles per minute can be achieved while curing the ink under compression in the nip between the transfer roll and receiving surface. In addition to reduced print thickness, curing the ink in the compressed state has the further potential for a print that is improved in uniformity, and that exhibits smooth surfaces on both sides.

Another key element, in meeting the requirements for color filter printing with a collector process, is the offset rolls themselves. It is desirable to utilize higher durometer offset blankets, particularly for the collector, to minimize distortion during transfer. Even if repeatable, distortion can be a problem due to the need to register to the ITO electrodes. Consequently, offset blankets need to be constructed to minimize distortion. At the same time, they must still provide for satisfactory ink pick-up and release.

The cohesive strength in the radiation-curable inks is much higher than is feasible with thermoplastic inks. This enables the transfer roll and collector to employ less releasing surfaces in the process. It has also led to the potential for use of a non-silicone surface, such as a fluorocarbon polymer, as the collector surface. This has a distinct advantage in that no silicone will be on the top of the printed color filter pattern on the glass. Thus, rejection problems are avoided when overcoating the printed filter with a polyimide planarization layer. Significant rejection problems have been reported in the literature when silicone release surfaces were utilized in color filter manufacture via conventional techniques.

While the silicone film problem is amenable to being solved, the ability to use a non-silicone collector is regarded as a distinct advantage. It has, therefore, been demonstrated that the present inks can be transferred from silicones to fluorocarbons, and then to the glass substrate.

Fluorocarbon materials were tested as collector surfaces for thermoplastic inks, but were found to be unsatisfactory.

The fluorocarbon materials accepted the thermoplastic inks from the silicone transfer rolls; however, consistent 100% release to a glass substrate was not achieved. In contrast, the fluorocarbon materials have been found capable of providing 100% release when using radiation-curable inks. The reason for the superior functioning of the radiation-curable inks is their higher cohesiveness after a partial cure. To attain 100% release, ink cohesion must be greater than adhesion of the ink to its releasing surface.

In addition to the nature of the collector surface, actual structure of the collector should be such that surface distortion is minimal or non-existent. This will result if the collector exhibits a relatively rigid surface, such as a fluorocarbon film backed by an elastomer layer to allow compensation for substrate warpage. This is expected to become more critical as the substrate size increases.

As noted earlier, it has been proposed to print a color pattern on film, to inspect the pattern, and, if satisfactory, to transfer the film and pattern to a substrate. Our process can be viewed as producing a color pattern on film in situ, followed by immediate transfer to a substrate. Inspection, prior to transfer, is feasible. Thus, transfer to a substrate can be avoided if the printed filter does not meet specification. Our apparatus has cleaning rolls which remove the ink from the collector when printing to ware is not desired. This ability to inspect the color filter, prior to application to the glass, provides us with the advantage of the film process while avoiding the disadvantage of the film cost.

We may use either gravure or screening for printing onto the transfer roll or first offset surface. We have also demonstrated a flexographic process wherein the first offset roll is replaced with a flexographic roll supplied with ink from an inking plate or roll. We may also employ a rigid typographic printing plate or roll to replace the transfer roll in the process. The use of a typographic printing technique not only eliminates the need for a first offset surface, but also allows single step curing of the ink under compression. This would occur during transfer to a transparent substrate by exposure from a light positioned beneath the substrate. Successful transfer and curing in this manner has been demonstrated.

The invention is further described with respect to specific apparatus embodiments for practicing the invention.

FIG. II is a perspective view of an apparatus 30. Apparatus 30 is designed to apply the process illustrated in FIG. I to production of a four-color pattern on a glass substrate.

Apparatus 30 embodies four rolls 32, 34, 36, and 38. Rolls 32–38 are shown as being suitably suspended, gravure type rolls. Each roll is associated with an ink source 40 and a doctor blade 42. Ink source 40 may be supplied with an appropriate colored ink in known manner.

Apparatus 30 further embodies an assembly that includes a transfer roll 44, a collector roll 46, and a cleaning roll 48. Associated with roll 44 is a source of radiation 50, for example, a UV lamp. The assembly is adapted to synchronized movement in conjunction with a support slide 52 which carries a flat glass substrate 54. Slide 52 has a recessed area 56 in its upper surface in which substrate 54 is securely held in a fixed position, for example, by a vacuum hold. This provides a continuous flat surface across the upper side of substrate 54 and support slide 52. Support slide 52 is carried by, and moves on, a main slide 58 mounted on a base 60.

In operation, the assembly moves in conjunction with slide 58 and substrate 54. As a result, transfer roll 44 visits roll 32 and receives a single color pattern therefrom. This pattern may be cured to a tacky state on transfer roll 44 and transferred to collector roll 46. In like manner, transfer roll 44 sequentially visits each of rolls 34, 36 and 38 to receive the unique color pattern of each roll. Each pattern is transferred to collector roll 46 to assemble a complete four-color pattern on roll 46. This pattern may then be inspected at an inspection unit 62. If rejected, the pattern may be removed by cleaning roll 48. If accepted, the complete pattern is transferred from collector roll 46 to substrate 54.

This ability to inspect the pattern before transfer to the substrate is an important feature of the invention. In some products, such as LCD panels, the glass substrate is a relatively expensive component that is lost when a defective pattern is printed. While it has been proposed to avoid that loss by use of a plastic film as an intermediate, the present process obviates the need for an intermediate. In addition, the disposal of rejected product, and the cost of glass cleaning for recycling, are minimized.

FIG. III is a partial side view of FIG. II. It shows the arrangement as transfer roll 44 visits roll 32 to receive the initial ink pattern for transfer to collector roll 46. It will be appreciated that this operation is repeated serially as the assembly moves along main slide 58. This permits transfer roll 44 to visit each of rolls 34, 36, and 38 and pick up an ink pattern therefrom.

FIG. II shows rolls 32–38 as gravure rolls. It will be appreciated that typographic or lithographic rolls might be substituted. In that case, a different ink source might be provided, and doctor blade 42 omitted, in customary manner. Use of a gravure roll or a screening mechanism requires offset roll 44 as well as collector roll 46. Otherwise, in producing a multi-color pattern, a previous color will tend to transfer back to the gravure roll or screen. A typographic roll does not require an offset roll since there is no contact except in the print areas on the roll. Likewise, a lithographic roll does not require an offset roll since the non-print areas do not accept ink.

Also, a combination of different type rolls is contemplated. For example, in printing a pattern involving red, green, and blue color dots within a black linear framework, the black framework might be printed initially. In that case, roll 32 might be a gravure roll. Rolls 34, 36, and 38, which would provide the three color dot patterns, might be typographic or lithographic rolls.

It is also contemplated that the initial ink patterns may be formed on traditional gravure or etch plates. While these may be heated, it is a feature of the present process, and more particularly the inks employed, that a pattern may be transferred at ambient temperature. This is normally desired in order to avoid possible registration problems due to temperature variations within a plate, or between successive plates. It also avoids effects on ink rheology.

FIG. IV, like FIG. II, is a perspective view of an apparatus generally designated 70. FIG. IV illustrates use of the process with gravure plates. These plates may be of the etched or intaglio type, or may be of the sensitized, flat plate type. Both types are commonly used in the decorating art.

Apparatus 70 embodies four gravure plates 72, 74, 76, and 78. Each plate is provided with a doctor blade 80 and a source (not shown) of the particular colored ink required for its pattern. In operation, a supply of an appropriate ink will be applied to each plate. The ink pattern is formed by moving doctor blade 80 across the plate.

Apparatus 70 further embodies an assembly 82. The same elements are included as shown in the assembly of FIG. II, but arranged rather differently. Thus, assembly 82 includes a transfer roll 84 and a collector roll 86, but collector roll 86 is positioned above transfer roll 84. This is the reverse of the arrangement in FIGS. II and III. Likewise, main slide 88 is positioned above support slide 90, and substrate 92 is held in a recess 94 on the underside of slide 90.

Apparatus 70 further embodies a radiation source 96, a cleaner roll 98 and an inspection unit 100. As explained earlier, the ability to inspect the complete pattern prior to printing, and the provision of a simple means of cleaning a defective pattern from a roll without printing, are important advantages of the invention.

The operation of apparatus 70, and particularly assembly 82, is essentially similar to that of apparatus 30. However, the arrangement of components is reversed. Thus, assembly 82 moves in conjunction with main slide 88 and substrate 92. In this way, transfer roll 84 serially visits plates 72–78 and receives a pattern from each. Each ink pattern is cured to a tacky state and transferred to collector roll 86 before transfer roll 84 proceeds to the next plate. After each individual pattern is collected on collector roll 86, the complete multi-color pattern is then inspected at unit 100. It is then either transferred in total to substrate 92 or removed by cleaner roll 98.

FIG. V is a partial side view of FIG. IV. Doctor blade 80 is removed to better illustrate the operation. FIG. V shows the arrangement of assembly 82 as transfer roll 84 visits plate 72. There, it receives the initial ink pattern for transfer to collector roll 86. The operation is repeated as assembly 82 moves from plate to plate. This permits transfer roll 84 to pick up the ink pattern from each plate and transfer it to collector roll 86.

It will be observed that operation of apparatus 70, as depicted in FIGS. V and VI, embodies a single forward motion of roll pair 84 and 86 to accomplish all of the required functions. This provides the ultimate in registration consistency. FIG. VI illustrates an enlarged view of FIG. V, showing ultraviolent radiation sources 99*a*, 99*b* and 99*c* in the transfer roll 84, collector roll 86, and behind the substrate 92, respectively.

We claim:

1. A method of printing a multi-color ink pattern on a substrate surface which comprises the steps of arranging a series of surfaces in which each surface has a pattern that is unique to one of the colors in the multi-color pattern, supplying to each patterned surface a radiation-curable ink formulation having an appropriate colorant to form an ink pattern thereon, transferring individually the colored ink pattern from each patterned surface to a collector roll, forming a composite of the color patterns on the collector roll, increasing the cohesiveness of the ink sufficiently, while the ink pattern is on the collector roll, to permit complete transfer of the pattern directly to the substrate surface, and transferring the composite pattern in its entirety to the substrate surface.

2. A method in accordance with claim 1, wherein said step of arranging a series of surfaces comprises arranging a series of patterned surfaces selected from the group consisting of typographic, lithographic, gravure or screen printing surfaces, said patterned surfaces being arranged on a roll or a flat plate.

3. A method in accordance with claim 2 further comprising picking up the ink pattern formed on a gravure roll or gravure flat plate by a transfer roll, increasing the cohesiveness of the ink while the ink pattern is on the transfer roll and transferring the ink pattern to the collector roll.

4. A method in accordance with claim 3 comprising picking up the ink pattern by the transfer roll from the gravure roll or flat plate at ambient temperature.

5. A method in accordance with claim 4 comprising at least partially curing the ink pattern by irradiation while on the transfer roll.

6. A method in accordance with claim 2 comprising picking up the ink pattern formed on a typographic or lithographic roll by the collector roll.

7. A method in accordance with claim 6 comprising at least partially curing the ink pattern by irradiation while on the collector roll.

8. A method in accordance with claim 7 comprising at least partially curing the ink pattern by radiation from within the collector roll.

9. A method in accordance with claim 2 wherein each of the selected surfaces is on a gravure roll or flat plate and a single transfer roll is used to pick up of the series of colored inks and transfer it onto said collector roll.

10. A method in accordance with claim 1 wherein said arranging a series of patterned surfaces comprises arranging a gravure roll or flat plate and having a linear pattern thereon, and a lithographic or typographic roll or plate having a dot pattern thereon.

11. A method of forming a color filter in accordance with claim 1, wherein said supplying ink step comprises supplying a free-radical, radiation-curable ink to each patterned surface, and said transferring step comprises transferring the composite pattern in a single step to form a color filter for a liquid crystal display.

12. A method of forming a color filter in accordance with claim 1, wherein said supplying ink step comprises supplying a radiation-curable ink curable by a cationic mechanism to each patterned surface and said transferring step comprises transferring the composite pattern in a single step from a color filter a liquid crystal display.

13. A method in accordance with claim 1 wherein said supplying ink step comprises supplying a hybrid free radical-cationic, or free radical-thermal, radiation-curable ink to each patterned surface, and curing the free radical portion of the ink more rapidly than the cationic or thermal portion.

14. A method in accordance with claim 1 wherein each ink supplied to a patterned surface has a color pigment embodied in its composition.

15. A method in accordance with claim 1 which comprises irradiating each ink pattern with ultra-violet or visible light to at least partially cure the ink and increase its cohesiveness.

16. A method in accordance with claim 15 which comprises irradiating the ink pattern from within a transfer roll that is transparent to the radiation to partially cure the ink pattern.

17. A method in accordance with claim 1 which comprises the ink pattern.

18. A method in accordance with claim 17 which comprises compressing the ink pattern between a transfer roll and the collector roll, or between the collector roll and the substrate whereby the ink pattern is flattened.

19. A method in accordance with claim 17 which comprises irradiating the ink pattern while it is in a compressed state.

20. A method in accordance with claim 1 which comprises irradiating the ink pattern through the substrate.

21. A method in accordance with claim 20, wherein said irradiating comprises emitting UV radiation through the substrate.

22. A method in accordance with claim 1, which comprises irradiating the ink pattern during deposition to the substrate.

23. A apparatus for printing a multi-color ink pattern on the surface of a substrate comprising;

a. series of ink receiving surfaces in which each surface has a pattern that is unique to one of the colors in the multicolor pattern,
b. a supply of a radiation-curable ink for each patterned surface,
c. a collector roll,
d. means to advance the collector roll each patterned surface to receive an ink pattern,
e. a source of radiation so positioned to be capable of curing the ink pattern during deposition to the substrate.

24. An apparatus in accordance with claim 23 wherein at least one ink receiving surface is on a gravure roll or flat plate.

25. An apparatus in accordance with claim 23 wherein all of the ink receiving surfaces are gravure rolls or plates.

26. An apparatus in accordance with claim 23 wherein a first ink receiving surface is on a gravure roll or flat plate to print a linear pattern and a second ink receiving surface is on a typographic, lithographic, or screen surface to print a dot pattern.

27. An apparatus in accordance with claim 23 which further includes a transfer roll.

28. An apparatus in accordance with claim 27 wherein the transfer roll and the collector roll move as a unit.

29. An apparatus in accordance with claim 27 wherein the collector roll and the transfer roll are so positioned that the ink pattern is compressed between the two rolls.

30. An apparatus in accordance with claim 23, wherein the radiation source is positioned within said collector roll, and said collector roll is transparent.

31. An apparatus in accordance with claim 30, wherein the collector roll is composed, at lease in part, of a fluorocarbon.

32. An apparatus in accordance with claim 30 wherein the collector roll has an elastomeric base with a thin outer layer of a non-elastic material to receive an ink pattern.

33. An apparatus in accordance with claim 32 wherein the non-elastic, outer layer material is a fluorocarbon.

34. An apparatus in accordance with claim 23 wherein the radiation source is positioned adjacent to, but exterior of, the collector roll.

35. An apparatus in accordance with claim 23 wherein the radiation source is positioned to direct radiation through the substrate.

36. An apparatus in accordance with claim 23 which further comprises an inspection unit positioned to inspect a multi-color pattern on the collector roll before transfer to the substrate.

37. An apparatus in accordance with claim 23, wherein the radiation source is positioned to emit radiation through the substrate.

38. A method of printing a multi-color ink pattern on a substrate surface comprising: p1 arranging a series of patterned surfaces; p1 supplying to each of the patterned surfaces a radiation-curable ink formulation, each patterned surface receiving a different colored ink; p1 transferring individually the colored ink pattern from each patterned surface to a collector roll to form a composite multi-colored ink pattern thereon; and p1 transferring the multicolored pattern in a single step from the collector roll directly to a glass substrate.

39. The method of claim 38, wherein, during said transferring step, said multi-colored ink pattern is in a liquid state.

40. The method of claim 38, wherein said supplying step comprises supplying a hybrid free radical-cationic, or free radical-thermal, radiation curable ink to each patterned surface, and curing the free radical portion of the ink more rapidly than the cationic or thermal portion.

* * * * *